(12) United States Patent
Clements et al.

(10) Patent No.: US 9,274,745 B2
(45) Date of Patent: Mar. 1, 2016

(54) REMOTE CONTROL AND SYNCHRONIZATION OF MULTIPLE AUDIO RECORDING LOOPING DEVICES

(71) Applicant: Harman International Industries, Inc., Stamford, CT (US)

(72) Inventors: William E. Clements, Murray, UT (US); Christopher M. Belcher, Lehi, UT (US); Ken Fredrickson, South Jordon, UT (US); Donald Milham, American Fork, UT (US); Michael Gordon, West Jordon, UT (US)

(73) Assignee: Harman International Industries, Inc., Stamford, CT (US)

( * ) Notice: Subject to any disclaimer, the term of this patent is extended or adjusted under 35 U.S.C. 154(b) by 158 days.

(21) Appl. No.: 14/042,283

(22) Filed: Sep. 30, 2013

(65) Prior Publication Data
US 2015/0094833 A1   Apr. 2, 2015

(51) Int. Cl.
G06F 17/00 (2006.01)
G06F 3/16 (2006.01)
G11B 27/00 (2006.01)
G10H 1/00 (2006.01)
G11B 27/10 (2006.01)
G10H 1/34 (2006.01)
G10H 1/40 (2006.01)

(52) U.S. Cl.
CPC .................. *G06F 3/165* (2013.01); *G10H 1/00* (2013.01); *G10H 1/0041* (2013.01); *G10H 1/348* (2013.01); *G10H 1/40* (2013.01); *G11B 27/00* (2013.01); *G11B 27/10* (2013.01); *G10H 2210/381* (2013.01); *G10H 2210/385* (2013.01); *G10H 2220/066* (2013.01); *G10H 2220/076* (2013.01); *G10H 2220/081* (2013.01); *G10H 2240/325* (2013.01); *G10H 2250/641* (2013.01)

(58) Field of Classification Search
CPC . G10H 1/00; G10H 1/0058; G10H 2210/191; G10H 2240/295; G10H 7/02; G10H 2250/641
See application file for complete search history.

(56) References Cited

U.S. PATENT DOCUMENTS

| | | | | |
|---|---|---|---|---|
| 6,574,685 B1 * | 6/2003 | Schwartz et al. | ................ | 710/31 |
| 7,309,829 B1 * | 12/2007 | Ludwig | ........................... | 84/622 |
| 2003/0172797 A1 * | 9/2003 | Juszkiewicz et al. | ........... | 84/601 |
| 2007/0119290 A1 * | 5/2007 | Nomitch | ......................... | 84/603 |
| 2010/0195840 A1 * | 8/2010 | Ciccone | .......................... | 381/61 |

* cited by examiner

Primary Examiner — Andrew C Flanders
(74) Attorney, Agent, or Firm — Brooks Kushman P.C.

(57) ABSTRACT

A musical apparatus including a first audio looping device for being electrically coupled to a second audio looping device is provided. The first audio looping device being configured to receive a first audio signal from a first musical instrument and to store the first audio signal. The first audio looping device being further configured to playback the stored first audio signal as a first loop a first number of times. The first audio looping device being further configured to transmit synchronization information to the second audio looping device that stores a second audio signal and that plays back the stored second audio signal as a second loop a second number of times. The synchronization information enabling the first loop and the second loop to be synchronized with one another during playback.

20 Claims, 8 Drawing Sheets

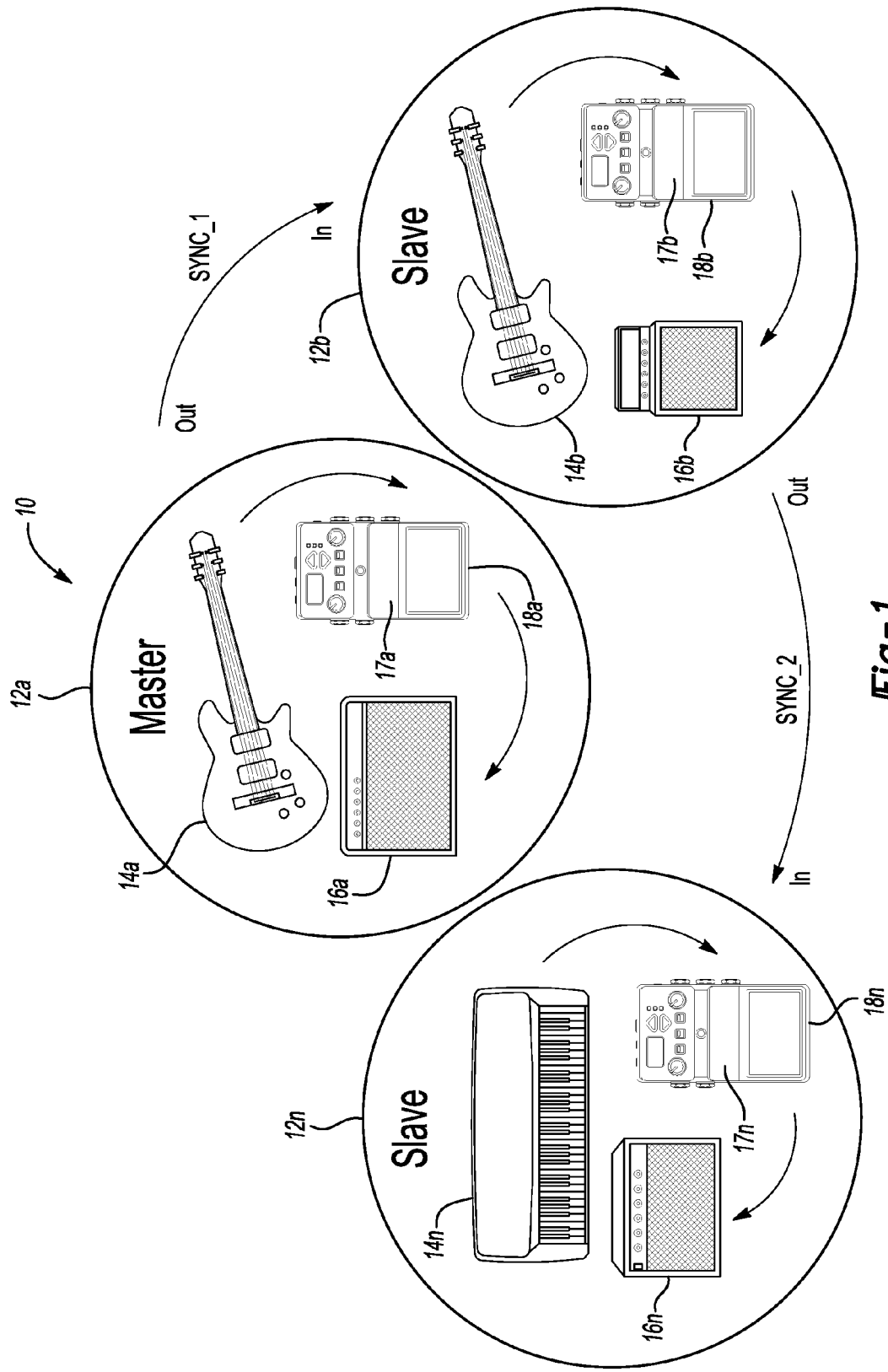

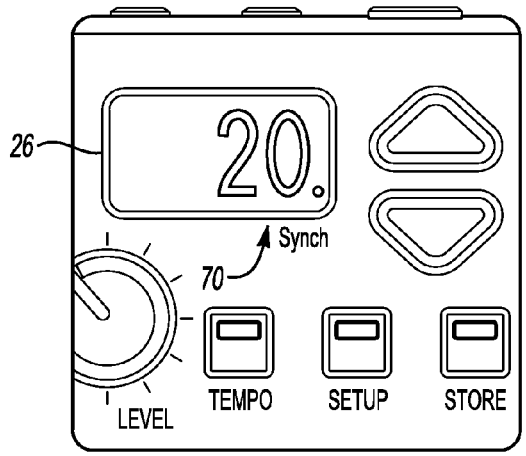
Fig-4
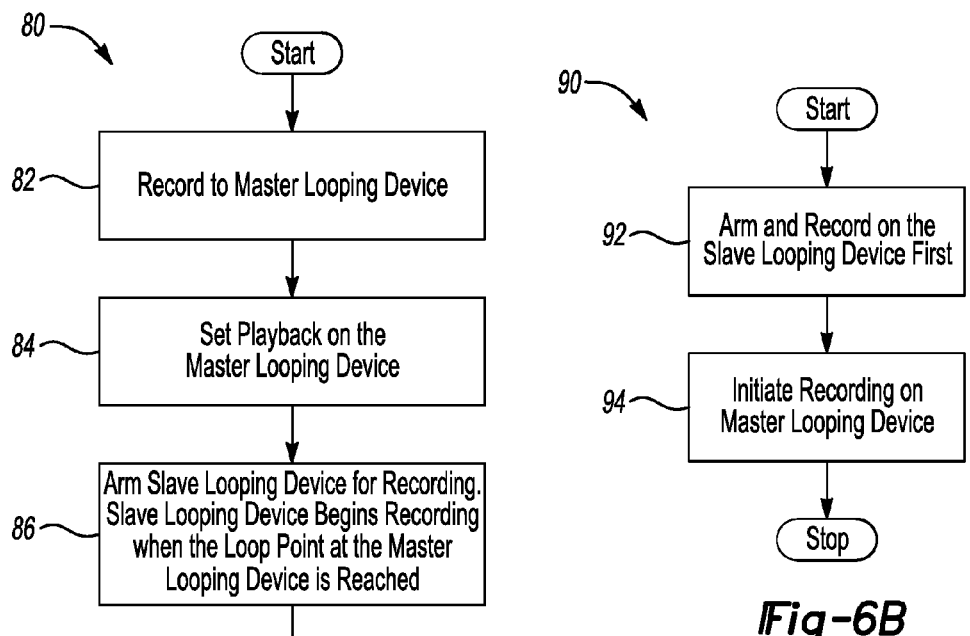
Fig-5
Fig-6A
Fig-6B

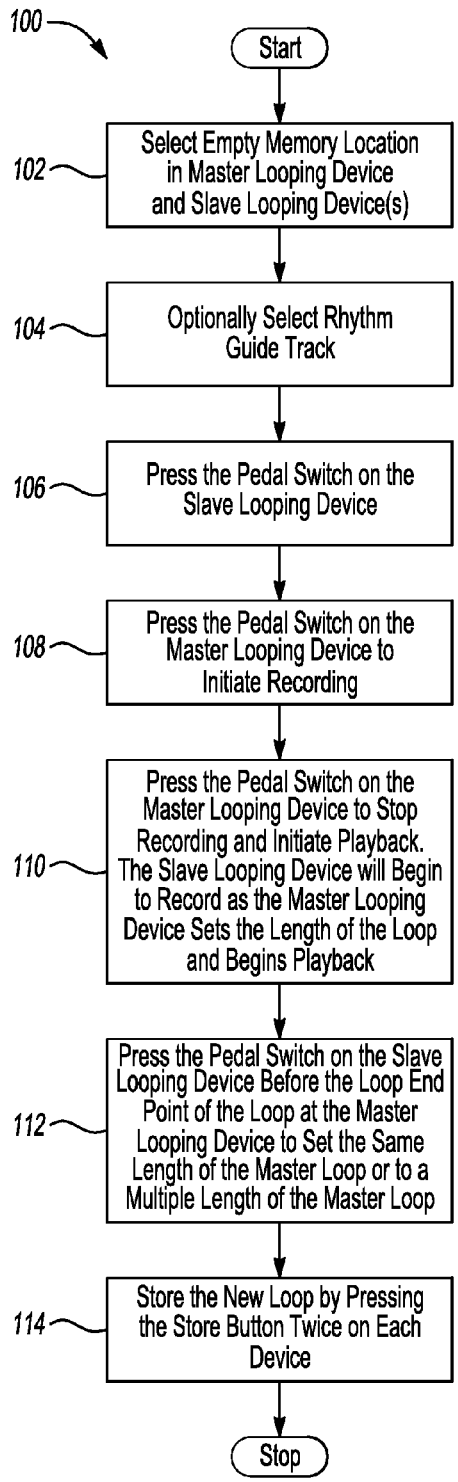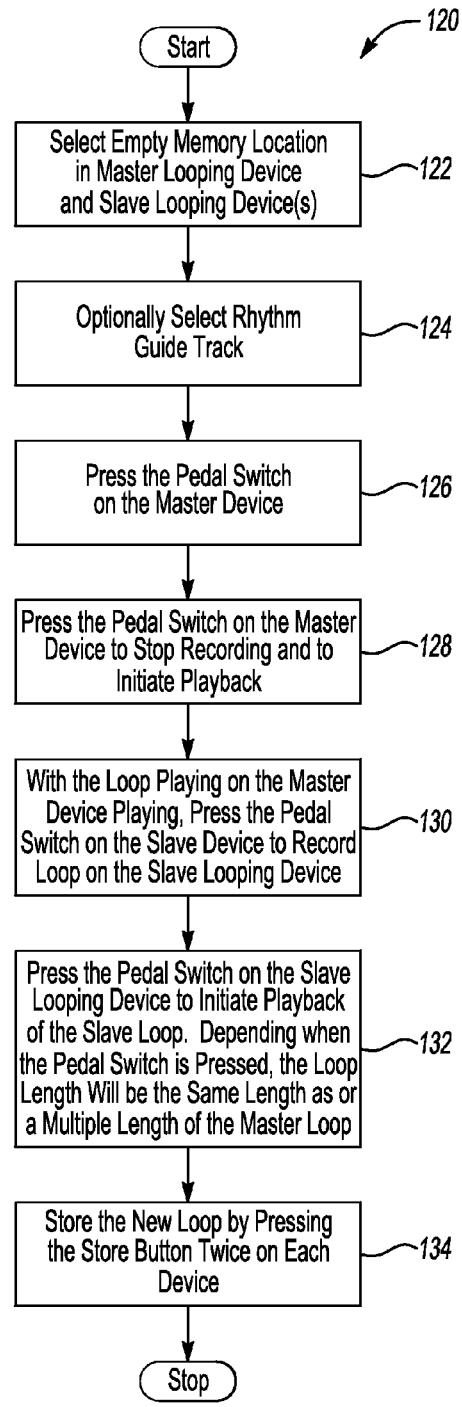
Fig-7
Fig-8

US 9,274,745 B2

REMOTE CONTROL AND SYNCHRONIZATION OF MULTIPLE AUDIO RECORDING LOOPING DEVICES

TECHNICAL FIELD

Aspects disclosed herein generally relate to remote control and synchronization of multiple audio recording looping devices.

BACKGROUND

Musicians, such as guitarists, bassists, keyboard players, etc. may use an audio looping device to record a baseline rhythm for playback. The audio looping device plays back the underlying rhythm track (or loop) to allow the musician to play over the track with additional rhythms or solos. For example, the musician may record and set a length of an initial loop with the audio looping device so that additional layers of musical parts are played over the initial loop to build a multipart musical piece with a single instrument.

In one example, the audio looping device may be implemented in the form of a pedal that is positioned between the musical instrument and an amplifier. The musician may activate or deactivate recording a rhythm and subsequently activate the playback of the recorded loop via a switch on the pedal by foot or hand. The audio looping device, while implemented in the form of a pedal, may be daisy-chained with a number of additional pedals (e.g., distortion, chorus, and reverb) to enable the musician to achieve any number of desired audio outputs for his/her instrument. In another example, the audio looping device may be implemented into an integrated multi-effects unit along with a number of musical instrument effects that also enable the musician to achieve any number of desired audio outputs for his/her musical instrument. The recording of the loop and the playback of the recorded loops with an audio looping device (e.g., either as a pedal or integrated within the multi-effects unit) and the addition of various musical layers over the loop is generally viewed or seen as a single musician endeavor or "one man band."

SUMMARY

In at least one embodiment, a musical apparatus including a first audio looping device for being electrically coupled to a second audio looping device is provided. The first audio looping device is configured to receive a first audio signal from a first musical instrument and to store the first audio signal. The first audio looping device is further configured to playback the stored first audio signal as a first loop a first number of times. The first audio looping device is further configured to transmit synchronization information to the second audio looping device that stores a second audio signal and that plays back the stored second audio signal as a second loop a second number of times. The synchronization information enables the first loop and the second loop to be synchronized with one another during playback.

In at least one embodiment, a musical apparatus including a first audio looping device for being electrically coupled to a plurality of second audio looping devices is provided. The first audio looping device is configured to receive a first audio signal from a first musical instrument and to store the first audio signal. The first audio looping device is further configured to playback the stored first audio signal as a first loop a first number of times. The first audio looping device is further configured to transmit synchronization information to the plurality of second audio looping devices. Each second audio looping device stores a second audio signal and plays back the stored second audio signal as a second loop a second number of times. The synchronization information enables the first loop and each of the second loops to be synchronized with one another during playback.

In at least one embodiment, an apparatus of synchronizing audio loops is provided. The apparatus comprises a master audio looping device for being electrically coupled to a slave audio looping device. The master audio looping device is configured to receive a first audio signal from a guitar and to store the first audio signal. The master audio looping device is further configured to playback the stored first audio signal as a first loop a first number of times. The master audio looping device is further configured to transmit synchronization information to the slave audio looping device that stores a second audio signal as received from a musical instrument and that plays back the stored second audio signal as a second loop a second number of times, the synchronization information enabling the first loop and the second loop to be synchronized with one another during playback.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 1 depicts a system for synchronizing a plurality of audio looping devices in accordance to one embodiment;

FIG. 4 depicts one aspect of the audio looping device for notifying the musician that the audio looping device is synchronized with another audio looping device;

FIG. 5 depicts various device configurations for the audio looping device accordance to one embodiment;

FIGS. 6A-6B depict methods for recording audio to the plurality of audio looping devices in accordance to one embodiment;

FIG. 7 depicts a method for recording sequential loops with the plurality of audio looping devices in accordance to one embodiment;

FIG. 8 depicts a method for recording loops one at a time with the plurality of audio looping devices in accordance to one embodiment;

DETAILED DESCRIPTION

Figure 2A:
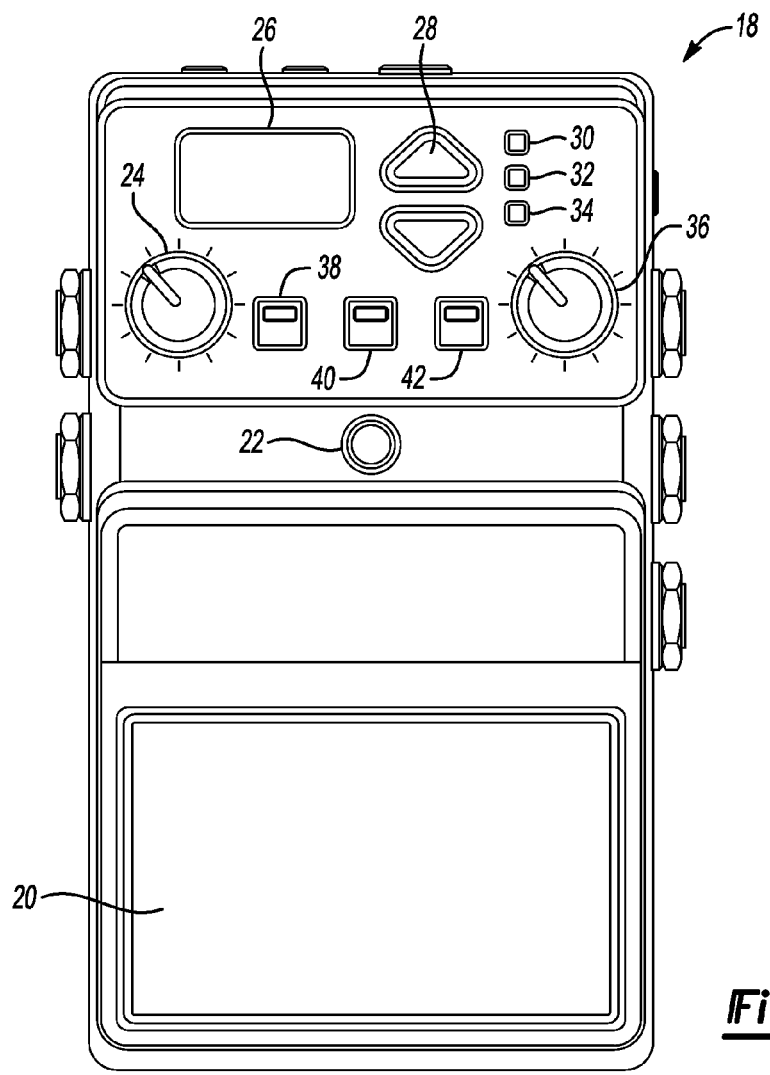
FIGS. 2A-2D depict various views of an audio looping device in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof, and software which co-act with one another to perform operation(s) disclosed herein.

Various audio looping devices have been used by musicians as a single independent device. The musician may use the audio looping device to record a first loop (i.e., record a particular rhythm track for the purpose of having the recorded loop repeated or played back a number of times), set a length of the loop and sequentially add multiple audio parts (or overdub) over the first loop to build up a multipart musical piece on a single device. In one example, a guitarist may record a baseline rhythm track with the audio looping device and then have the audio looping device playback the recorded rhythm while the guitar plays a solo along with the recorded loop. In another example, a guitarist may record a baseline rhythm track with the audio looping device and while the audio looping device is playing the recorded baseline rhythm, the guitarist can overdub another rhythm track over the recorded baseline rhythm loop which is merged with the baseline loop such that both recorded parts are played back together. This greatly enhances the level of creativity for the guitarist and aids in the overall production of music.

The genre of looping has always been a "one man band" endeavor, as audio looping devices are designed to allow a single musician to build up a complete looping song. It is recognized herein that an audio looping device can be provided to control and allow additional separate audio looping devices to be connected together and to work in conjunction with each other to allow for a more complex looping experience. Such a looping experience may include a single musician with multiple audio looping devices (i.e., that are synchronized with one another). In this case, the musician may couple multiple looping devices together and record a corresponding loop on each looping device. Each recorded loop at each corresponding audio looping device may be different from one another. To playback the recorded loops at the various audio looping devices, a master audio looping device may synchronize the loops as played back at each audio looping device to ensure that the multiple number of loops are played back at the proper sequence or timing (i.e., to prevent the loop from exhibiting a drift condition). The looping experience may also be extended to multiple musicians who each have an audio looping device. In this case, a guitarist can record a guitar loop at a first looping device and a bassist can record a bass loop at a second looping device. The first looping device may be set as a master and synchronize the playback of the guitar loop and the bass loop to ensure that they start at the same time.

In either case, the use of multiple audio looping devices may be synchronized with one another so that the audio output (or loop) from each audio looping device is properly aligned with one another. If the various recorded loops at each audio looping device are not properly aligned (or synched) with one another so that they are played back at the same time, the various loops within the multipart audio loop will drift over time which is undesirable and easily detectable by the musician(s).

In one aspect, each audio looping device may receive a signal(s) (e.g., synchronization data) from a master looping device to synchronize the recording, control and playback of the various loops. For example, each audio looping device may include a synchronization input port therein for receiving synchronization data from a master audio looping device. The synchronization port on each audio looping device may receive a plug from another audio looping device (or master looping device) to daisy-chain the two or more looping devices together. In another example, synchronization information may be wirelessly transmitted to each audio looping device from a master audio looping device. The designation of the master audio looping device may be configured by via hardware and software control. These features and other will be discussed in more detail below. These features and others will be discussed in more detail below.

FIG. 1 depicts a system 10 for synchronizing a plurality of audio loops in accordance to one embodiment. A number of musicians 12a-12n ("12") are provided and each musician 12 is configured to play a particular musical instrument 14a-14n ("14"). For example, musician 12a may be a guitarist that plays the guitar 12a; musician 12b may be a bassist that plays the bass 12b; and musician 12n may be a keyboardist that plays the keyboard 14n. A corresponding amplifier 16a-16n ("16") is provided for each musician 12 to amplify an audio output from each instrument 14n. Each musician 12 may also include a corresponding audio looping device 18a-18n. For example, the guitarist 12a may record and play back an audio loop (or guitar loop) from the guitar via the audio looping device 18a, the bassist 12b may record and play back an audio loop (or bass guitar loop) via the audio looping device 18a, and the keyboardist 12n may record and playback an audio loop (or keyboard loop).

It is recognized that any number of instruments 14 may be used for the corresponding audio looping devices 18 for the purpose of recording and playback of various audio loops. In general, each audio looping device 18 is configured to record a corresponding piece of music (e.g., loop) for its corresponding instrument 14 and to playback the recorded loop which can be repeated any number of times (e.g., this can be set by the musician at the audio looping device 18). For example, the guitarist 12a may record a rhythm (or lick) and playback the rhythm as a guitar loop at the audio looping device 18a; the bassist 12b may record a rhythm (or bass line) and playback the rhythm as a bass loop at the audio looping device 18b, and the keyboardist 12n may record a rhythm and playback the rhythm as a keyboard loop at the audio looping device 18n. While each audio looping device 18 is generally shown as a pedal, it is recognized that the audio looping devices 18 may be integrated into a multi-effects unit which comprises a number of different effects for modifying the audio output of a particular instrument 14.

In general, each musician 12 may record and playback a loop at each corresponding audio looping device 18 to enable one or more of the musicians 12 the ability to play over the loops as they are played back by the various audio looping devices 18. This allows each musician 12 to add more layers of music on top of the recorded loops. Prior to playback, it is generally necessary to synchronize the loops to ensure that each loop has the same starting point to ensure that two or more of the loops as played back do not drift with respect to one another.

To ensure that the audio loops are synchronized with one another, each audio looping device 18 is generally electrically coupled to one another (e.g., via cable/plug or wireless communication) for transmitting synchronization information to one another. For example, the audio looping device 18a may be configured to serve as a master looping device 18a which shares a communication link (e.g., SYNC_1) with the audio looping device 18b. The audio looping device 18b may be set as a first slave looping device 18b which shares a communication link (e.g., SYNC_2) with the audio looping device 18n. The audio looping device 18n may be set as a second slave looping device 18n. Each communication link (e.g., SYNC_1 and SYNC_2) may comprise a cable/plug implementation or wireless implementation in which each audio looping device 18 may include a corresponding transceiver 17a-17n ("17") for wirelessly communicating with one another. The manner in which a particular audio looping device 18 is arranged as a master will be discussed in more detail below.

The master looping device 18a may transmit synchronization information to the first slave looping device 18b over the communication link SYNC_1. In turn, the first slave looping device 18b will transmit the synchronization information as received from the master looping device 18a to a second slave looping device 18n. The information as transmitted from the master looping device 18a synchronizes the audio loop for each looping device 18 to ensure that corresponding loops start at the same time and maintain the proper time alignment for the underlying rhythms that are played back in the loops.

FIGS. 2A-2D depict various views of the audio looping device 18 in accordance to one embodiment. FIG. 2A depicts a front view of the audio looping device 18. The audio looping device 18 generally includes a pedal switch 20, a status light 22, and a loop level control 24. The pedal switch 20 is generally configured to start recording a rhythm to generate a loop and to toggle between loop playback and overdubbing. The pedal switch 20 may also be used for tapping in a tempo into a new loop and for undoing and redoing the last overdub. In general, by pressing the pedal switch 20 a predetermined number of times, the musician 12 may quickly stop the loop playback.

The status light 22 is generally configured to indicate status during recording, playback, and overdub. For example, a solid red status light may indicate that a particular rhythm is being recorded. A flashing red status light may indicate that the audio looping device 18 is armed to record using an auto record function. A solid green status light may indicate that the loop is being played back. A flashing red/green status light may indicate a tempo record count in. The tape record count in generally operates in the following manner. A predetermined tempo and time signature may be set prior to recording a baseline loop. When this has been set, the initial press of the pedal switch 20 will invoke the status light 22 to flash for a single measure count before recording begins. For example, if the time signature is set to four, when the pedal switch 20 is pressed to initiate recording, the status light 22 will flash red once (e.g., first beat) then green 3 times (e.g., remaining 3 beats of measure for a total of 4 beats total) at the predetermined tempo thus providing the musician 12 a count in prior to actually recording the baseline loop. A slave flashing red status light may indicate that the audio looping device 18 is armed for recording. A slave flashing green status light may indicate the audio looping device 18 is armed for play. The loop level control 24 generally controls an output level of the audio looping device 18.

The audio looping device 18 generally includes a display 26, up/down switches (buttons) 28, and a loop indicator 30. The display 26 is generally configured to display the currently selected loop memory location and "slave status" for the audio looping device 18. The display 26 may also provide information during various operational procedures and provide setup menu navigation such as, but not limited to, displaying and editing the tempo of a loop. The up/down buttons 28 are used to select loop memory locations or to navigate through and configure setup menu options. The up/down buttons 28 can be used to cue up the next loop as saved in another memory location for seamless on-the-fly loop transitions. The loop indicator 30 provides a green status light which indicates the currently selected memory location that is set to playback continuously the corresponding loop in the memory location when the play (or playback is initiated). The loop is the default setting for recorded phrases. When a phrase is recorded by the audio looping device 18, it is by default set to playback as a continuous seamless phrase when playback is initiated. The audio looping device 18 can also be configured to play back recorded phrases only once. Such a playback that occurs only once is generally referred to as a 'single' phrase rather than a 'loop'. A loop can be converted to a single phrase and vice versa. When the loop indicator 30 is flashing, internal or external memory (e.g., memory card (not shown)) is accessing stored phrase data. In this case, the external memory (if applicable) should be kept in the audio looping device 18 at this time.

The audio looping device 18 generally includes a single indicator 32, a card memory indicator 34, and a rhythm level control 36. The single indicator 32 indicates the current memory location that is set to playback a single phrase which is played back only once when playback is initiated. In general, a single phrase can be converted into a loop and vice versa. The card memory indicator 34 provides an indication in response to various selected loop memory locations of an external memory (e.g., option micro SD/SDHC memory card, etc.) (see element 64 in connection with FIG. 20). When the indicator 34 is off, loops may be selected via internal memory locations of the audio looping device 18. The audio looping device 18 also includes its own internal memory locations for storing loops in addition to external memory to store the loops. The rhythm level control 36 is generally configured to control the output level of a rhythm guide track. The rhythm guide track is generally a pre-recorded sample of a percussion style instrument that plays back during recording and playback of a phrase and is used as an adjustable audible metronome of the phrase's tempo.

The audio looping device 18 generally includes a tempo button 38, a setup button 40, and a store button 42. The tempo button 38 may be depressed a predetermined number of times to set the tempo for a new loop or to change the tempo of a stored loop. Various beats are indicated by a flashing red light on the tempo button 38 on the first down beat and a flashing green light on the tempo button 38 for all remaining beats of the measure. If the tempo of a stored loop is changed, the audio looping device 18 plays back the loop at the new tempo without any change in pitch. Pressing and holding the tempo button 38 will reset and tempo change applied to the loop (e.g., the loop is brought back to its original tempo) as long as the tempo change has not been stored to memory.

The setup button 40, when selected, enables the audio looping device 18 to enter into a setup mode where global parameters and loop attributes can be changed. Such parameters and loop attributes include rhythm guide track type, time signature, pedal tempo on/off, etc. The store button 42 stores and copies loops and stores changes to the various loop attributes. By pressing and holding the store button 42, a currently selected loop can be deleted.

Figure 2B:
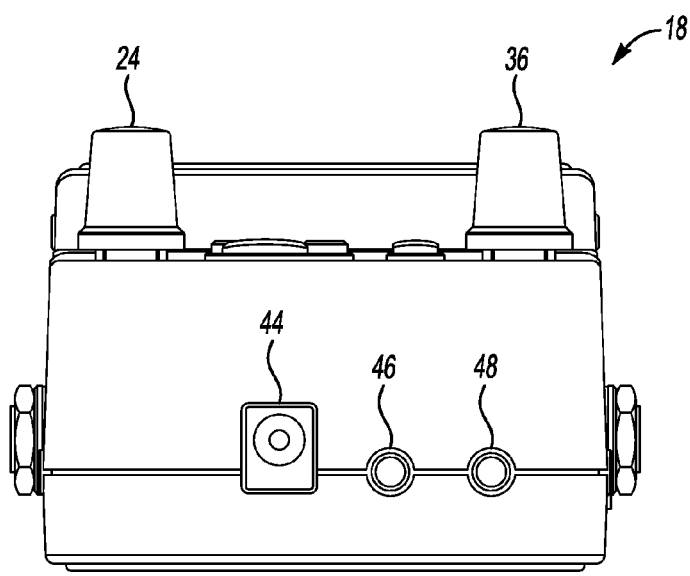

Referring now to FIG. 2B, the audio looping device 18 generally includes a power input 44, a synchronization output (or synchronization output port) 46, and a synchronization input (or synchronization input port) 48. The power input 44 is connected to an external power supply for powering the audio looping device 18. The synchronization output 46 is generally an output provided from the audio looping device 18 that is electrically coupled to the synchronization input 48 of another audio looping device 18. In one example, a ⅛" tip/ring/sleeve "TRS" stereo mini cable may be connected to the synchronization output 46 and the synchronization input 48. While the audio looping device 18 may utilize a cable/plug interface between the synchronization output 46 and the synchronization input 48, it is recognized that the two or more audio looping devices 18 may wirelessly communicate with one another. As noted above, each audio looping device 18 may include a transceiver for transmitting and receiving information to and from another audio looping device 18. In general, the information as transmitted from the synchronization output 46 of one audio looping device 18 to the synchronization input 48 of another audio looping device 18 includes the synchronization information which synchronizes the audio loops during playback at each respective audio looping device 18. This aspect will be discussed in more detail below.

Figure 2C:
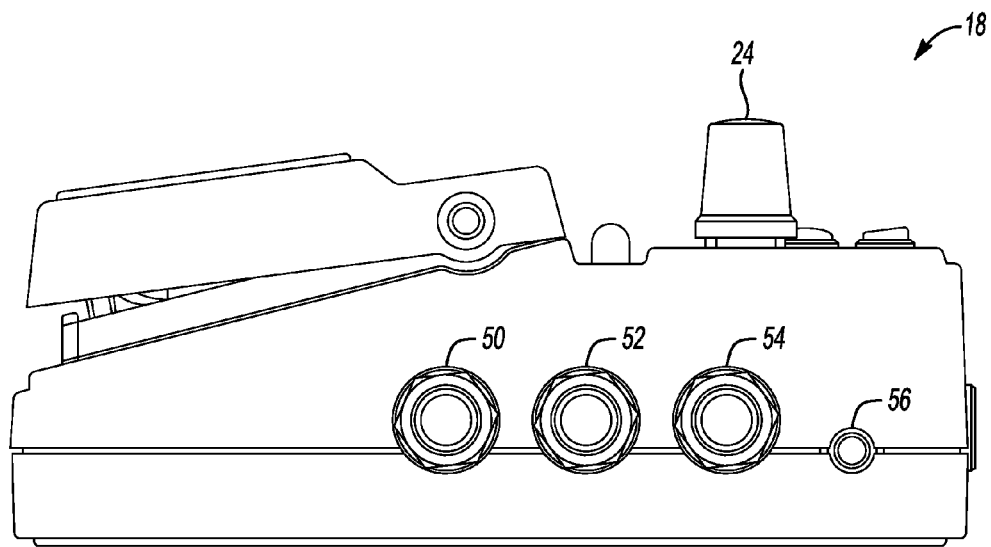

Referring now to FIG. 2C, the audio looping device 18 generally includes a footswitch jack 50, a right input jack 52, a left input jack 54, and an auxiliary input jack 56. The footswitch jack 50 is generally configured to receive a cable/plug to provide commands from another footswitch (e.g., FS3X footswitch) for remotely selecting loop memories, tapping in loop tempo, and performing stop and clear functions at the audio looping device 18. The right input jack 52 and the left input jack 54 are each generally configured to receive a cable/plug for enabling mono or stereo operation. The right and left inputs are processed separately through an internal looper engine and then feed to the left and right outputs (see left output jack 58 and right output jack 60 in connection with FIG. 2D). The auxiliary in jack 56 is configured to receive a cable/plug to accept a stereo source such as audio from a portable music player.

Figure 2D:
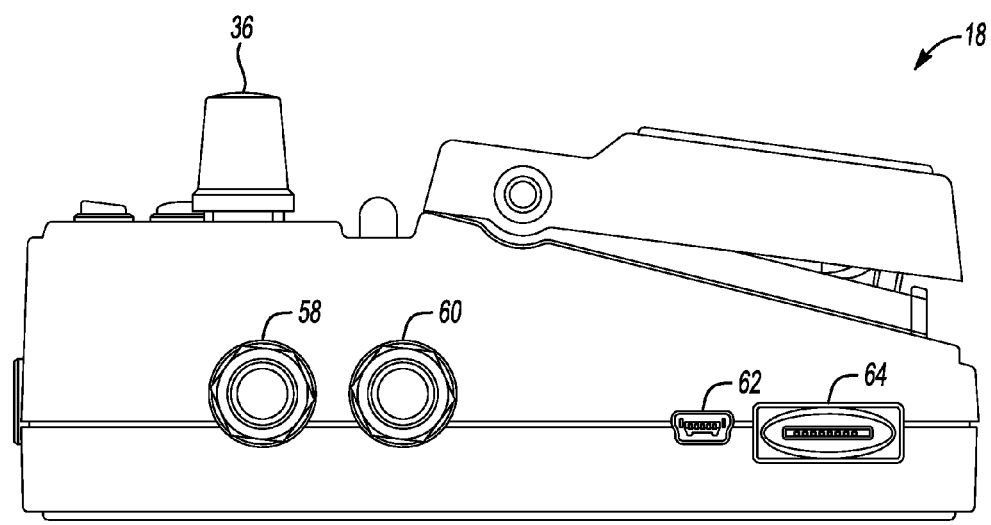

Referring now to FIG. 2D, the audio looping device 18 generally includes a left output jack 58, a right output jack 60, a USB jack 62, and a micro-memory card slot 64. The left output jack 58 is generally coupled via a cable/plug to an input of a single amplifier 16 (e.g., guitar amplifier), an input of another pedal, or an amps effect return. The right output jack 60 is generally coupled via a cable/plug to an input of a second guitar amplifier (e.g., guitar amplifier) when a second amplifier is being used. The USB jack 62 generally provides a connection to a computer (e.g., PC or Mac®) for transferring loop files (e.g., saved recorded loops) thereto via a loop librarian module (not shown) as provided within the audio looping device 18. The micro-memory card slot 64 serves as an expansion slot that is compatible for receiving external memory, but not limited to, Micro SD/SDHC memory cards up to 32 GB in size.

Figure 3:
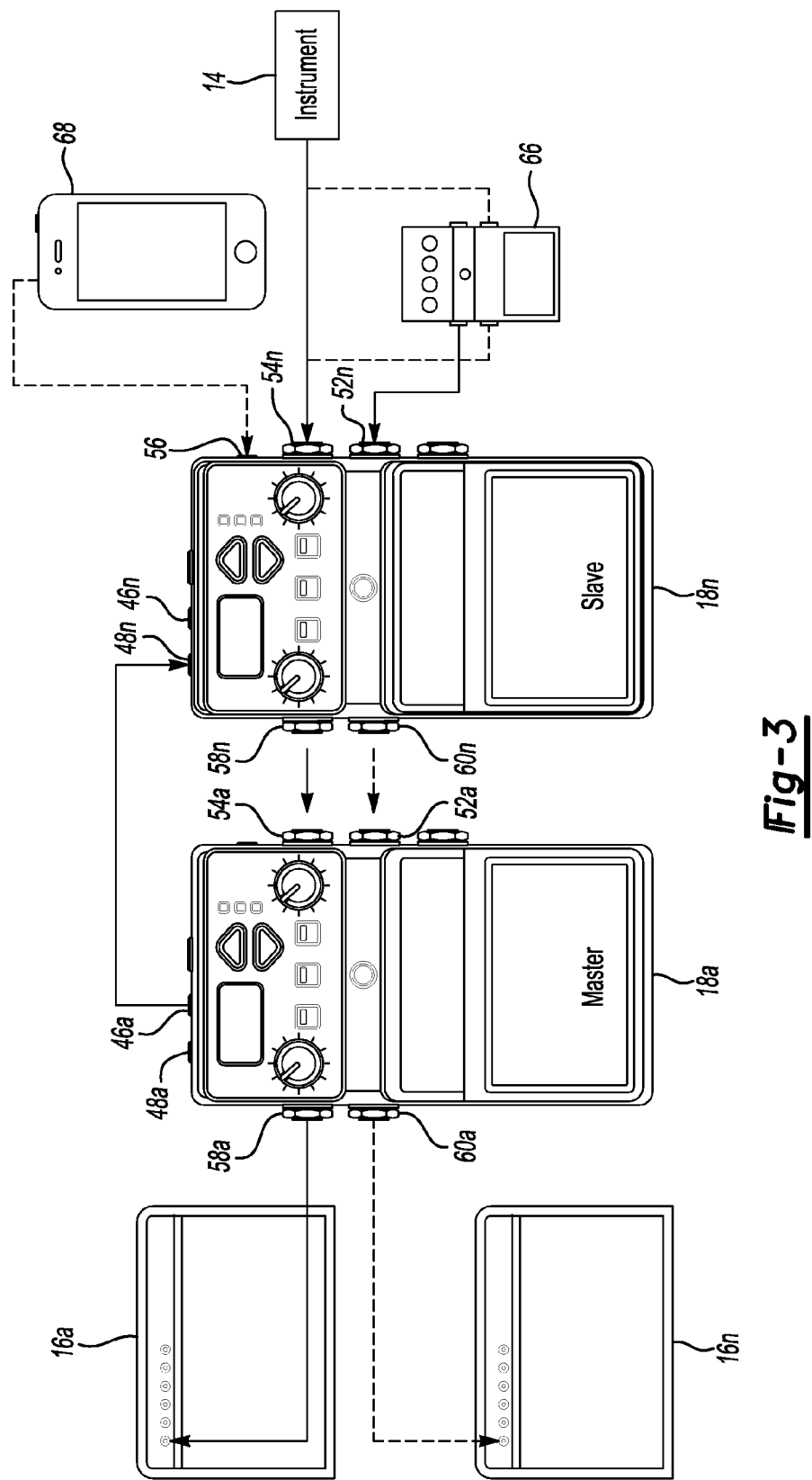
FIG. 3 depicts a multi-audio looping device arrangement that interfaces with a single musical instrument in accordance to one embodiment.

FIG. 3 depicts an arrangement in which a single instrument 14 is utilized to interface with a first audio looping device 18a and a second audio looping device 18n. In this configuration, the musician 12 desires to record and playback a first loop at the first audio looping device 18a with the instrument 14 and further desires to record and playback a second loop at the second audio looping device 18n with the instrument 14. In this case, when playback is desired, the first audio looping device 18a acts as a master looping device 18a and transmits the synchronization information from the synchronization output 46a thereof to the synchronization input 48n of the second audio looping device 18n (or the slave looping device 18n) to synchronize the playback of the loops as played back. The manner in which the audio looping device 18 establishes itself as a master or slave will be discussed in more detail in connection with FIG. 9.

As illustrated in FIG. 3, the instrument 14 is coupled to the left input jack 54n of the slave looping device 18n. It is recognized that a pedal effect 66 (e.g., reverb, distortion, chorus, etc.) may be positioned between the instrument 14 and the slave looping device 18n. The instrument 14 may be coupled to the pedal effect 66. The pedal effect 66 may be coupled to the right input jack 52n. The left output jack 58n of the slave looping device 18n may provide an output to the left input jack 54a of the master looping device 18a. The right output jack 60n of the slave looping device 18n may provide an output to the right input jack 52a. The left output jack 58a of the master looping device 18a may provide an output to the amplifier 16a. The right output jack 60a of the master looping device 18a may provide an output to the amplifier 16n. A music player 68 may be optionally connected to the auxiliary input jack 56 of the slave looping device 18n to provide another audio source.

FIG. 4 generally illustrates that the display 26 includes an indicator 70 to indicate that the slave looping device 18n is properly sync connected to the master looping device 18a. This condition illustrates that the master looping device 18a and the slave looping device 18n are communicating with one another. When the indicator 70 indicates that the slave looping device 18n is connected to the master looping device 18a, the master looping device 18a synchronizes the loops that are played back from the master looping device 18a and the slave looping device 18n.

FIG. 5 depicts various device configurations 72 for the audio looping device 18 in accordance to one embodiment. The configurations 72 as illustrated in FIG. 5 describe the manner in which loops are recorded to the audio looping devices 18a-18n. For example, each parameter 74 (e.g., pedal tempo, auto record, record sequence, loop level, and rhythm level) on the master looping device 18a is set in accordance to those as displayed in master settings 76 as shown in FIG. 5. In addition, each parameter 74 (e.g., pedal tempo, auto record, record sequence, loop level, and rhythm level) on the slave looping device 18n is to be set in accordance to the those displayed on slave settings 78 as shown in FIG. 5.

FIG. 6A depicts a method 80 for recording audio to the plurality of audio looping devices 18 in accordance to one embodiment. It is recognized that for all audio looping devices 18 that record audio, each audio looping device 18 is set to an empty looping memory location prior to recording.

In operation 82, a rhythm or track (e.g., audio data) is recorded to the master looping device 18. It is recognized that the master looping device 18a and the slave looping device 18n is to be connected to each other utilizing the synchronization output 46 and the synchronization input 48 as set forth in the FIG. 1 or FIG. 3 prior to recording the audio to the master looping device 18a and the second looping device 18n.

In operation 82, the musician 12 may select an empty memory location via the up/down buttons 28 in the master looping device 18a (or on the external memory card) and select the pedal switch 20 to record the audio data to the empty memory location.

In operation 84, playback of the recorded audio is initiated at the master looping device 18a. In other words, the master looping device 18a plays the recorded audio data as a loop.

In operation 86, the slave looping device 18n is armed for recording after the master looping device 18a is put into a playback state. Once the loop as played back by the master looping device 18a reaches its loop point (or start of the loop), the slave looping device 18n will begin recording.

FIG. 6B illustrates another method 90 for recording audio to the plurality of audio looping devices 18 in accordance to one embodiment. It is recognized that for all audio looping devices 18 that record audio, each audio looping device 18 is set to an empty looping memory location prior to recording.

In operation 92, the slave looping device 18n is armed for recording first.

In operation 94, the audio data is recorded to the master looping device 18a. Generally, with the method 90, the recording of the loop (or the audio data) will then automatically begin on the slave looping device 18n as soon as a loop end point is set on the master looping device 18a. In other words, once the master looping device 18a sets the loop point (e.g. end of the recording of the loop), the master looping device 18a notifies the slave looping device 18n to initiate recording. In general, the audio data recorded to the master looping device 18a is downstream from the input of the slave looping device 18n so recorded data is not transferred from master looping device 18a to the slave looping device 18n (see FIG. 3).

FIG. 7 depicts a method 100 for recording sequential loops with the plurality of audio looping devices 18 in accordance to one embodiment.

In operation 102, an empty memory location in each audio looping device 18 (e.g., the master looping device 18a and the slave looping device(s) 18a) is selected using the up/down buttons 28. The indicator 70 and the status light 22 will be turned off in this operation.

In operation 104, a rhythm guide track may be optionally selected. The rhythm guide track provides an audible metronome in the master looping device 18a to record with. On the master looping device 18a, the musician 12 turns up the rhythm level 9 to a position of about 9 o'clock. The tempo button 38 is selected a predetermined number of times on the master looping device 18a based on the rate for the desired tempo. In response, the rhythm guide track is active and an audible rhythm track is provided in the master looping device 18a's outputs 58 and 60 and the corresponding beats will be indicated via flashing lights on an LED on the tempo button 38. When using the rhythm guide track, the time signature of the loop may be manually set to a time signature that is different than the default time signature of four beats per measure.

In operation 106, the pedal switch 20 is selected on the slave looping device 18n. This operation will arm the slave looping device 18n for recording as indicated by a flashing red status LED (or status light) 22.

In operation 108, the pedal switch 20 is selected on the master looping device 18a to initiate recording the audio data (or loop). If the rhythm guide track is selected as noted in operation 104, a "measure count in" is provided as indicated by a flashing red and green status on the LED 22. After the "measure count in" is provided, the musician 12 begins playing with the first beat being used to trigger the recording of the loop. The master looping device 18a will then provide a solid red status light on the LED 22 to indicate that the loop is being recorded.

In operation 110, the pedal switch 20 on the master looping device 18a is selected to stop recording and to initiate playback of the loop. At the same time, the slave looping device 18n will initiate recording when the master looping device 18a sets the length of the loop and begins playback. The recording of the loop on the slave looping device 18n will be indicated by a solid red status LED 22. At this time, the musician 12 may play the audio that is desired to be recorded at the slave looping device 18n while the master looping device 18a plays back the loop that was recorded thereto.

In operation 112, to record a loop at the same length in the slave looping device 18n as the loop that was recorded at the master looping device 18a or to record a loop at a multiple integer of the length of the master loop), the pedal switch 20 is selected on the slave looping device 18n before or immediately after an end point of the loop as played back on the master looping device 18a. It is recognized that the musician 12 can record loops at a length that is at least two or more times longer (i.e., on the slave looping device 18n) than the length of the loop as recorded on the master looping device 18a. In general, the length of the loop on the slave looping device 18n is a multiple of the length of the loop on the master looping device 18a. Once the length of loop on the slave looping device 18n has reached its end point (or the loop end point is set via the musician 12 at the slave looping device 18n), the recorded loop of the master looping device 18a and the recorded loop of the slave looping device 18n are synched together and will be played back together.

In operation 114, optionally store the recorded loops via the store button 42 on each of the master looping device 18a and the slave looping device 18n by pressing the store button 42 a predetermined number of times (e.g., two) if recorded loops are to be recalled for use at a later time.

FIG. 8 depicts a method 120 for recording loops one at a time with the plurality of audio looping devices 18 in accordance to one embodiment.

In operation 122, an empty memory location in each audio looping device 18 (e.g., the master looping device 18a and the slave looping device(s) 18n is selected using the up/down buttons 28. The indicator 70 and the status light 22 will be turned off in this operation.

In operation 124, a rhythm guide track may be optionally selected. This is similar to operation 104 as noted in connection with FIG. 7.

In operation 126, the pedal switch 20 is selected on the master looping device 18a to record a loop. The musician 12 will begin to play to record. In general, the master looping device 18a first records a loop that the slave will then sync to in step 130. If the rhythm guide track was selected as noted in operation 124, a measure count in is provided as indicated by a flashing red and green status on the LED 22. After the measure count in is provided, the musician 12 begins playing with the first beat triggering the recording of the loop. The master looping device 18a will provide a solid red status light on the LED 22 to indicate that the loop is being recorded.

In operation 128, the pedal switch 20 on the master looping device 18a is selected to stop recording and to initiate playback of the loop.

In operation 130, while the master looping device 18a is playing back the recorded loop, the pedal switch 20 on the slave looping device 18n is selected. A flashing red status will be visible on the LED 22 to indicate that the slave looping device 18n is now armed for recording. When the loop as recorded at the master looping device 18a restarts playing the master loop, the slave looping device 18n will initiate recording. The recording of the loop on the slave looping device 18n will be indicated by a solid red status LED 22. At this time, the musician 12 may play the audio that is desired to be recorded at the slave looping device 18n while the master looping device 18a plays back the loop that was recorded thereto.

In operation 132, to record a loop at the same length in the slave looping device 18n as the loop that was recorded at the master looping device 18a, the pedal switch 20 is selected on the slave looping device 18n before or immediately after an end point of the loop as played back on the master looping device 18a. It is recognized that the musician 12 can record loops at a length that is at least two or more times longer (i.e., on the slave looping device 18n) than the length of the loop as recorded on the master looping device 18a. In general, the length of the loop on the slave looping device 18n is a multiple of the length of the loop on the master looping device 18a. Once the length of the loop on the slave looping device 18n has reached its end point (or the loop end point is set via the musician 12 at the slave looping device 18n), the recorded loop of the master looping device 18a and the recorded loop of the slave looping device 18n are synched together and will be played back together.

In operation 134, optionally store the recorded loops via the store button 42 on each of the master looping device 18a and the slave looping device 18n by pressing the store button 42 a predetermined number of times (e.g., two). When the recorded loops are stored, they may be used for later recall if desired.

Figure 9:
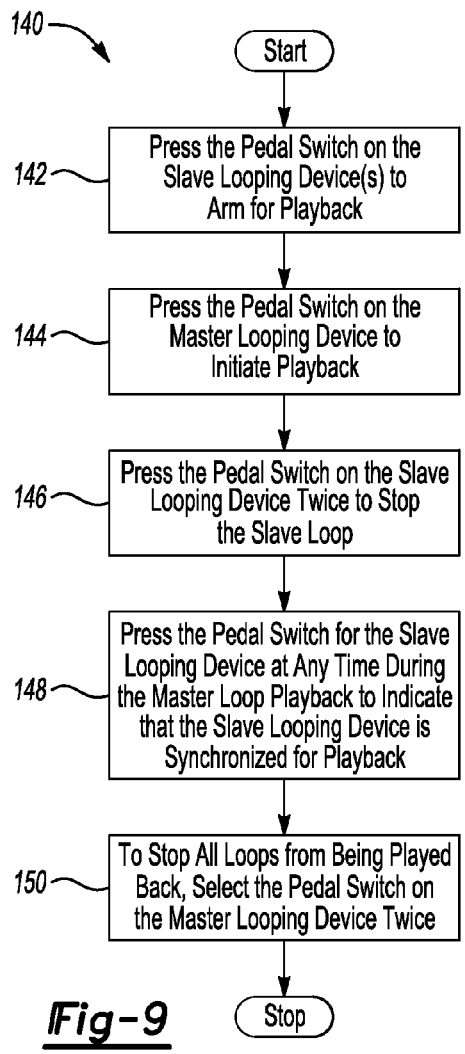
FIG. 9 depicts a method for playing back stored/recorded audio loops with the plurality of audio looping devices in accordance to one embodiment.

FIG. 9 depicts a method 140 for playing back stored/recorded audio loops with the plurality of audio looping devices 18 in accordance to one embodiment. It is recognized that if the stored loops from the master looping device 18a and the slave looping device 18n are to be synchronized, such loops must be recorded together first and then subsequently stored. Once the loops are synchronized, they form a synchronized set of loops. In general, when the loops are recorded, they are temporarily saved on the audio looping devices 18. However, for the loops to be stored for later recall as desired by the musician 12, it is necessary to download such loops into the empty memory locations of the audio looping devices 18.

In operation 142, the pedal switch 20 on any of the slave looping devices 12n is selected for the corresponding slave looping device 18n from which the musician 12 wants to playback a loop. Once selected, the status light 22 will flash with a green light to indicate that the selected slave looping device 18n is armed for playback (i.e., which will be synched with other loops played back from additional slave looping devices 18n).

In operation 144, the pedal switch 20 in the master looping device 18a is selected to initiate playback. The master looping device 18a will begin playing back its recorded loop along with the recorded (or armed) loops of the desired slave looping devices 12n. The slave looping devices 18n each playback their respective loops prior to the master looping device 18a initiating playback. In this operation, the loops are not synched with one another. In general, the loops (i.e., master and slave) that were recorded separately at different times will not be synchronized unless they start from a stopped state. Master and slave loops that were recorded together and then stored can still be synchronized during playback.

In operation 146, the pedal switch 20 for the slave looping device 18n is selected a predetermined number of times (e.g., two) in order to stop the playback of the loop.

In operation 148, to cue the desired slave looping device 18n for playback, the pedal switch 20 for each desired slave looping device 18n is selected at any time while the master looping device 18a plays back the loop. The status light 22 will flash with a green light to indicate that the slave looping device 18n is cued for sync playback. The slave looping device 18n begins playing back its corresponding loop the next time the loop as played back by the master looping device 18a reaches its starting point.

In operation 150, to stop all loops from being played back on all looping devices 18, the pedal switch 20 for the master looping device 18a is selected a predetermined number of times (e.g., two).

Figure 10:
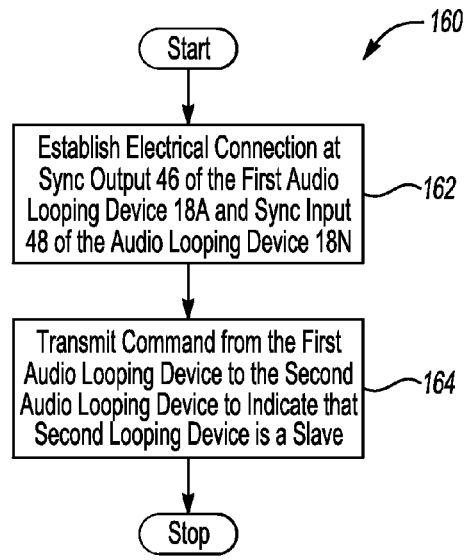
FIG. 10 depicts a method for configuring a particular audio looping device from a plurality of audio looping devices to be used as a master looping device.

FIG. 10 depicts a method 160 for configuring a particular audio looping device 18 from a plurality of audio looping devices 18 to be used as a master looping device 18a. In general, it is to be noted that each audio looping device 18 is configured as a master looping device 18a when provided to the musician 12. However, when two or more audio looping devices 18 are coupled together, only one of such audio looping devices 18 can be a master. The remaining audio looping devices are configured to be slaves. The method 160 describes the manner in which one of the audio looping devices 18 remains the master looping device 18a and the manner in which the remaining audio looping devices 18a become slave looping devices 18n.

In operation 162, an electrical connection is established at the synchronization output 46 of the first audio looping device 18a and at the synchronization input 48 of the second audio looping device 18n.

In operation 164, the first audio looping device 18a remains as the master as no input is received at the synchronization input 48. In this case, the first audio looping device 18a instructs the second audio looping device 18n to be a slave via command (e.g., "hello slave command"). The first audio looping device 18a transmits this command periodically (e.g., 200 ms) to the second audio looping device 18n (e.g., the slave) (and to any other slave looping devices that are daisy-chained with the first audio looping device 18a). In the event the command is no longer received at the second audio looping device 18n, it will change its status from slave back to master.

Figure 11:
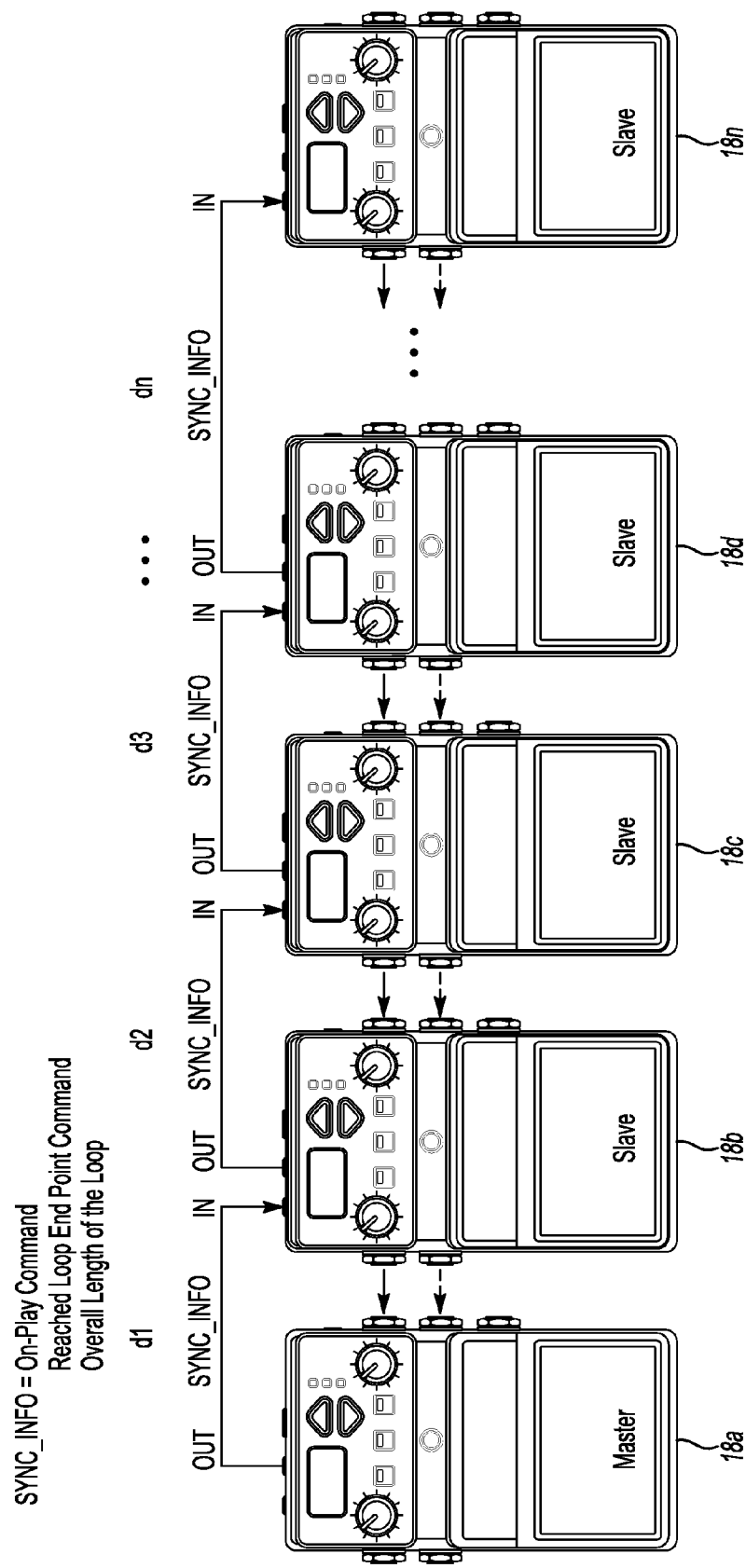
FIG. 11 depicts the plurality of audio looping devices that are coupled together in accordance to one embodiment.

FIG. 11 depicts the plurality of audio looping devices 18a-18n that are coupled together and the manner in which the plurality of audio looping devices 18a-18n may synchronize the play back of the loops. As illustrated, the audio looping device 18a is arranged as the master while the remaining audio looping devices 18b-18n are each arranged as slaves. In general, the master looping device 18a employs a look ahead delay implementation for synchronizing the various loops as played back from the audio looping devices 18a-18n to ensure they each start at the same time.

For example, a delay (e.g., d1-dn) is generally present when the master looping device 18a transmits information to the various slave looping device 18b-18n when such devices are daisy chained together. The delays may be attributed to cable lengths, processing of information at each slave looping device 18b-18n, etc. Accordingly, the master looping device 18 transmits synchronization information (e.g., SYNC_INFO) to the various slave looping devices 18b-18n to initiate playback of each recorded loop at a time that is greater than the sum of the delays (e.g., playback time of loops>d1+d2+d3+d4+ . . . dn). This condition ensures that the various slave looping devices 18b-18n will receive the synchronization information corresponding to the playback time to account for the delays attributed to the daisy chain effect (e.g., effect of coupling the various audio looping devices 18a-18n together) and that the audio looping devices 18b-18n will play back their corresponding loops at the same time after the expiration of all of the delays d1 . . . dn. The synchronization information generally includes an "on-play command" that is transmitted from the master looping device 18*a* to the slave looping devices 18*b*-18*n* which takes into account the various delays to initiate and synchronize the playback of the loops at each slave looping device 18*b*-18*n*.

The corresponding delays d1 . . . dn as noted above may be established in different ways. For example, there may be a maximum number of audio looping devices 18*a*-18*n* that can be coupled to one another. Accordingly, a value for each delay is established when the maximum number of audio looping devices 18*a*-18*n* are coupled to one another. Once the value for each delay is established, the sum of the delays (e.g., d1+d2+d3+d4+ . . . dn) may be stored in memory for each audio looping device 18*a*-18*n*. Thereafter, whenever any one of the audio looping devices 18 is the master looping device 18*a*, the master looping device 18 can transmit information to the slave looping device 18*b*-18*n* to playback their respective loops at a playback time that is greater than the sum of the delays. This condition will enable the loops as played back to be synchronized with one another.

In another example, each slave looping device 18*b*-18*n* may transmit information to the master looping device 18*a* to indicate that the slave looping device 18*b*-18*n* is electrically coupled to the master looping device 18*a*. In this case, each slave looping device 18*b*-18*n* may include identification information to identify its presence to the master looping device 18*a*. The master looping device 18*a* in this case accounts for the number of slave looping devices 18*b*-18*n* that transmit their respective identification information thereto, and determines the corresponding delay (or calculates the delay) based on the number of slave looping devices 18*b*-18*n* that are electrically connected to it. The master looping device 18*a* may then transmit the on-play command after upon expiration of the calculated delay to synchronize the playback of the loops for the slave looping devices 18*b*-18*n*. With this implementation, there is no limitation on the number of audio loops devices 18 that can be coupled together. In general, the on-play command as transmitted from the master looping devices 18*a* to the slave looping device(s) 18*n* serves as an indicator to notify each slave looping device 18*n* that the master looping device 18*a* has begun playing back its loop. Each slave looping device 18*n*, if armed for playback, will initiate playback of each corresponding loop in response to the on play command.

As noted above, the audio looping devices 18 may be daisy chained together as depicted in FIG. 11. As also noted above, the audio looping devices 18 may also be wirelessly coupled to one another. In another example, the audio looping devices 18 may also be electrically connected to one another via a star pattern (or arrangement). In the wireless implementation or in the star pattern implementation, the slave looping device(s) 18*b*-18*n* are arranged to receive the synchronization information from the master looping device 18*a* at generally the same time. In the daisy-chain implementation, each slave looping device 18*b*-18*n* receives the synchronization information serially.

The synchronization information as transmitted from the master looping device 18*a* to the slave looping devices 18*b*-18*n* may also include information such as a "reached loop end point command" that identifies the end of the loop as recorded (and played back) by the master looping device 18*a*. This condition further enhances the synchronization aspect between the master looping device 18*a* and the slave looping devices 18*b*-18*n*. For example, the master looping device 18*a* transmits the reached loop end point command in advance in order to take into account the various delays d1-dn of the daisy chain effect to the slave looping device 18*b*-18*n* (or to account for the overall lag in transmission and processing that cause the delays d1-dn). The reached end loop end point command indicates that the loop as recorded at the master looping device 18*a* has reached its end point. The master looping device 18*a* transmits the reached loop end point at a time that is adequate to allow each slave looping device 18*b*-18*n* to receive and process such information so that the slave looping device 18*b*-18*n* (i.e., the reached loop end point command is sent in advance of the actual point in time in which the master loop reaches its actual end point to account for the delays in transmission and processing) can determine whether it is necessary to restart (or resynchronize) a new loop to start at the same time the master loop is restarts. This condition minimizes drift between the various loops.

In particular, each slave looping device 18*b*-18*n* may include a window that corresponds to the amount of time the slave loop will reach its end point. In this case, when the slave looping device 18*b*-18*n* receives the reach loop end point command from the master looping device 18*a*, the slave looping device 18*b*-18*n* determines whether the slave loop will reach the end of its loop at generally the same time as the master loop. If the slave looping device 18*b*-18*n* determines that its slave loop will end at generally the same time of the master loop, the slave looping device 18*b*-18*n* will continue to allow the slave loop to be played back with no correction. If on the other hand, the slave looping device 18*b*-18*n* determines that the slave loop will not end at the same time of the master loop, the slave looping device 18*b* will restart (or resynchronize) its slave loop to start at the same time the next master loop is played back. This will be discussed in more detail in connection with FIG. 12.

Figure 12:
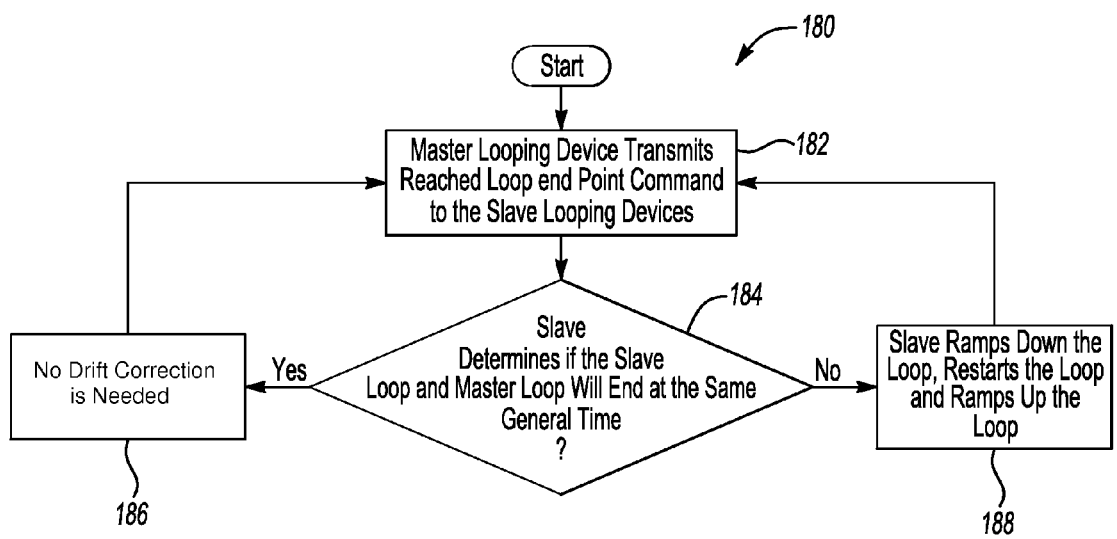
FIG. 12 depicts a method for employing the reach loop end point command in accordance to one embodiment.

FIG. 12 depicts a method 180 for employing the reach loop end point command in in accordance to one embodiment.

In operation 182, the master looping device 18*a* transmits the reached loop end point command to the slave looping device(s) 18*n*. The master looping device 18*a* transmits the reached loop end point at some time before the master loop actually reaches its end point to account for delays.

In operation 184, the slave looping device 18*n* determines whether its respective slave loop will end at the same time the master loop will end. If the slave looping device 18*n* determines that the slave loop will end within a predetermined amount of time (e.g., 10 ms) from the end of the master loop, then the method 180 moves to operation 186. If not, then the method 180 moves to operation 188.

In operation 186, the slave looping device 18*n* allows the existing loop that is being played back to continue to play and that no drift correction is needed to synchronize the slave loop with the master loop.

In operation 188, the slave looping device 18*n* restarts (or resynchronizes) the loop to start at the same time of the master loop. For example, the slave looping device 18*n* will ramp the volume down of the slave loop, restart the slave loop to playback at generally the same time of the master loop, and ramp up the volume of the slave loop. The gradual ramping down of the volume of the slave loop and gradual ramp up of the volume of the restarted loop may mask audible artifacts that are created as a result of resynchronizing the slave loop with the master loop. In general, this re-synchronization operation prevents the loops that are being played back from the master looping device 18*a* and the slave looping device 18*n* from drifting too far apart from one another.

It is recognized that the loops as synchronized between the master looping device 18*a* and the slave looping devices 18*n* are not synchronized to start with one another at the same exact time and that there may be some acceptable timing offset with respect to each loop starting playback of another.

Such an offset however is generally minimal as the musician 12 may not audibly hear or notice a difference between the start times of the loops. The use of the method 180 may prevent or minimize the drifts that may occur over time due to such minimal offsets as the loops are repeated over and over. For example, as the loops are played back any number of times, the drift may increase with respect to the starting times of the loops, the method 180 prevents such drift from increasing over time.

It is recognized that the slave looping device 18*n* will begin playing back (e.g., indicator on slave looping device 18*n* will blink green to show it is armed for playback and the pedal switch 20 is pressed once to arm the slave looping device 18*n* for playback) a loop in response to the on-play command or the reach loop end command if the slave looping device 18*n* is armed for playback. For example, the master looping device 18*a* may first transmit the on-play command to notify the slave looping device 18*n* that is has initiated loop playback. The slave looping device 18*n* may then initiate playback of the loop so that it is synchronized with the loop from the master looping device 18*a*. To account for any drifts that may occur between the master loop and the slave loop during playback, the master looping device 18*a* transmits the reach loop end command to the slave looping device 18*n* in accordance to the method 180 to minimize or prevent the master loop and the slave loop from drifting apart from one another. In order for these conditions to apply, the slave looping device 18*n* is to be armed to play. This condition indicates that the slave looping device 18*n* is in a state to begin playback upon command (e.g., on-play command) from the master looping device 18*a*.

The synchronization information as transmitted from the master looping device 18*a* to the slave looping devices 18*b*-18*n* may also include information such as an overall length of the loop (e.g., length of the loop in seconds) as played back by the master looping device 18*a* in addition to the overall tempo of the loop as played back by the master looping device 18*a* to perform quantization. This condition compensates for a musician 12 who may have started recording the loop at either the master looping device 18*a* or at the slave looping devices 18*n* either early or late. It is possible in this case that the timing associated in recording the loop if early or late may cause the loops to be off by 100 msec. For example, the slave looping devices 18*b*-18*n* may use the overall length and the overall tempo of the master loop to trigger off of the first beat of the measure of the master loop to synchronize the play back of its loop to account for recording the master loop early or late.

In general, quantization is used to enforce the creation of slave loops with lengths in relation to the length of the master loop. This may account for discrepancies with respect to when the slave loop was stopped during recording (e.g., either too early or too late in relation to the master loop). The slave looping device 18*n* creates loops that are an integer (1 to N) multiples of the length of the master loop. For example, a master loop of twenty seconds generally allows for a length of 20, 40, 60, and 80, etc. in length.

There are two modes of quantization. A forward quantizing generally includes the slave looping device 18*n* that continues to record a loop until the next integer multiple of the master loop length even if the slave looping device 18*n* is controlled to stop recording the slave loop. Reverse quantization includes truncating the recorded slave loop that exceeds the last integer multiple of the master loop length (e.g., one or two beats after the last integer multiple of the master loop length). With reverse quantization, the recorded slave loop is truncated to a previous boundary (or is truncated to the last integer of the master loop length).

In general, forward quantization is used to compensate for the condition in which the musician 12 stops recording the slave loop at a point that is earlier than the length of the master loop (or the length of a multiple integer of the master loop). In this case, the audio looping device 18 adds additional time to compensate for the early termination of the recording to the slave loop such that the slave loop is equal in length (or in time) to the master loop or to any multiple integer of the master loop. Reverse quantization is used to compensate for the condition in which the musician 12 stops recording the slave loop at a point in time that is later than the length of the master loop (or the length of a multiple integer of the master loop). In this case, the audio looping device 18 truncates a portion of the slave loop that exceeds the length of the master loop (or multiple integer of the master loop). Forward and reverse quantization enable the slave loop to be synchronized with the master loop when played back by the slave looping device 18*n*.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A musical apparatus comprising:
 a first audio looping device for being electrically coupled to a second audio looping device, the first audio looping device being configured to:
 receive a first audio signal from a first musical instrument;
 record the first audio signal;
 playback the recorded first audio signal as a first loop a first number of times; and
 transmit synchronization information to the second audio looping device that records a second audio signal from a second musical instrument and that plays back the recorded second audio signal as a second loop a second number of times, the synchronization information enabling the first loop and the second loop to be synchronized with one another during playback,
 wherein the first audio looing device is further configured to record the first audio signal prior to the second audio looping device recording the second audio signal.

2. The musical apparatus of claim 1 wherein the first audio looping device includes an output port for electrically transmitting the synchronization information via a cable/plug connection to an input port of the second audio looping device.

3. The musical apparatus of claim 1 wherein the first audio looping device includes a transceiver for wirelessly transmitting the synchronization information to the second audio looping device.

4. The musical apparatus of claim 1 wherein the synchronization information enables the first loop to be synchronized with the second loop by enabling the first loop and the second loop to start playback at a similar time to one another.

5. The musical apparatus of claim 1 wherein the first audio looping device includes memory for storing a first time value indicative of a time delay to account for a delay in transmission of the synchronization information to the second audio looping device and in processing of the synchronization information at the second audio looping device, the first audio looping device being further configured to transmit the synchronization information at a second time value that is greater than the first time value to enable the first loop and the second loop to be synchronized with one another during playback upon expiration of the time delay.

6. The musical apparatus of claim 1 wherein synchronization information includes an on-play command to indicate that the first audio looping device has initiated playback of the first loop and to control the second audio looping device to initiate playback of the second loop if the second audio looping device is armed for playback of the second loop.

7. The musical apparatus of claim 1 wherein the synchronization information includes a reached loop end point command which indicates a first end point of the first loop.

8. The musical apparatus of claim 7 wherein the second audio looping device determines whether a second end point of the second loop is similar in time to the first end point of the first loop.

9. The musical apparatus of claim 8 wherein the second audio looping device is configured to re-synchronize the first loop with the second loop if the second end point of the second loop is not similar in time to the first end point of the second loop by (i) ramping a volume down of the second loop, (ii) restarting the second loop to start at a similar time of the first loop, and (iii) ramping the volume up of the second loop.

10. The musical apparatus of claim 1 wherein the second audio looping device is configured to perform one of forward quantization to add additional time to generate the second loop that is equal in time or equal to a next integer multiple of a length of the first loop and reverse quantization to truncate a portion of the second loop that exceeds the length of time of the first loop or an integer a multiple of the length of the first loop.

11. A musical apparatus comprising:
a first audio looping device for being electrically coupled to a plurality of second audio looping devices, the first audio looping device being configured to:
receive a first audio signal from a first musical instrument;
record the first audio signal;
playback the recorded first audio signal as a first loop a first number of times; and
transmit synchronization information to the plurality of second audio looping devices, each second audio looping device records a second audio signal and plays back the recorded second audio signal as a second loop a second number of times, the synchronization information enabling the first loop and each of the second loops to be synchronized with one another during playback,
wherein the first audio looing device is further configured to record the first audio signal prior to the second audio looping device recording the second audio signal.

12. The musical apparatus of claim 11 wherein the first audio looping device includes an output port for electrically transmitting the synchronization information via a cable/plug connection to an input port of each of the second audio looping devices.

13. The musical apparatus of claim 11 wherein the first audio looping device includes a transceiver for wirelessly transmitting the synchronization information to each of the second audio looping devices.

14. The musical apparatus of claim 11 wherein the synchronization information enables the first loop to be synchronized with each of the second loops by enabling the first loop and each of the second loops to start playback at a similar time to one another.

15. The musical apparatus of claim 11 wherein the first audio looping device includes memory for storing a first time value indicative of a time delay to account for a total delay in the transmission of the synchronization information to each of the second audio looping devices and in the processing of the synchronization information at each of the second audio looping devices, the first audio looping device being further configured to transmit the synchronization information at a second time value that is greater than the first time value to enable the first loop and each of the second loops to be synchronized with one another during playback upon expiration of the time delay.

16. The musical apparatus of claim 11 wherein synchronization information includes an on-play command to indicate that the first audio looping device has initiated playback of the first loop and to control each of the second audio looping devices to initiate playback of the second loop if any one or more of the second audio looping devices of the plurality of audio looping devices is armed for playback of the second loop.

17. The musical apparatus of claim 11 wherein the synchronization information includes a reached loop end point command which indicates a first end point of the first loop.

18. The musical apparatus of claim 17 wherein each of the second audio looping devices determine whether a second end point of the second loop is similar in time to the first end point of the first loop.

19. The musical apparatus of claim 18 wherein each of the second audio looping devices is configured to re-synchronize the first loop with the second loop if the second end point of the second loop is not similar in time to the first end point of the second loop by (i) ramping a volume down of the second loop, (ii) restarting the second loop to start at a similar time of the first loop, and (iii) ramping the volume up of the second loop.

20. An apparatus for synchronizing audio loops, the apparatus comprising:
a master audio looping device for being electrically coupled to a slave audio looping device, the master audio looping device being configured to:
receive a first audio signal from a guitar;
record the first audio signal;
playback the recorded first audio signal as a first loop a first number of times; and
transmit synchronization information to the slave audio looping device that records a second audio signal as received from a musical instrument and that plays back the recorded second audio signal as a second loop a second number of times, the synchronization information enabling the first loop and the second loop to be synchronized with one another during playback,
wherein the master audio looing device is further configured to record the first audio signal prior to the slave audio looping device recording the second audio signal.

* * * * *